United States Patent [19]

Poduska, Jr.

[11] Patent Number: 5,777,599
[45] Date of Patent: Jul. 7, 1998

[54] IMAGE GENERATION DEVICE AND METHOD USING DITHERING

[75] Inventor: John W. Poduska, Jr., Belmont, Mass.

[73] Assignee: Oki Electric Industry Co., Ltd., Japan

[21] Appl. No.: 837,240

[22] Filed: Feb. 14, 1992

[51] Int. Cl.$^6$ .................................................. G09G 5/36
[52] U.S. Cl. ........................................ 345/136; 345/138
[58] Field of Search ................................ 340/728, 703;
345/136, 137, 138, 132, 133, 147, 149,
153, 155; 348/456, 798; 395/157, 132

[56] References Cited

U.S. PATENT DOCUMENTS

| | | | |
|---|---|---|---|
| 3,961,134 | 6/1976 | Jarvis | 345/147 |
| 5,179,641 | 1/1993 | Comins et al. | 395/132 |
| 5,294,984 | 3/1994 | Mori et al. | 345/136 |

*Primary Examiner*—Amelia Au
*Attorney, Agent, or Firm*—Edward D. Manzo; Mark J. Murphy; John J. King

[57] ABSTRACT

This invention relates to an improved image processing device which more rapidly provides an image that appears to have a greater resolution by using dithering to an output device having a lower resolution. An interpolator register cooperates with an input register. Dither values are loaded into the interpolator register and added to input data that has been loaded into the input register. The natural carry function of the adder performs any necessary incrementing, and an output register receives the sum, after truncation of as many bits as required to fit the dithered sum into the space available or usable by the display device.

24 Claims, 6 Drawing Sheets

| ORIGINAL LOCATION | ORIGINAL DITHER VALUE | NEW LOCATION | NEW LOCATION DITHER VALUE | PARTIAL $P_{(x,y)}$ |
|---|---|---|---|---|
| 0 0 | 0 | 0 1 | 1/2 | $dI_x + 1/2$ |
| 0 1 | 1/2 | 0 0 | 0 | $dI_x - 1/2$ |
| 1 0 | 3/4 | 1 1 | 1/4 | $dI_x - 1/2$ |
| 1 1 | 1/4 | 1 0 | 3/4 | $dI_x + 1/2$ |
| 0 0 | 0 | 1 0 | 3/4 | $dI_y + 3/4$ |
| 0 1 | 1/2 | 1 1 | 1/4 | $dI_y - 1/4$ |
| 1 0 | 3/4 | 0 0 | 0 | $dI_y - 3/4$ |
| 1 1 | 1/4 | 0 1 | 1/2 | $dI_y + 1/4$ |

(Rows 1–4: MOVE IN x-DIRECTION; Rows 5–8: MOVE IN y-DIRECTION)

WHERE $P_{n+1} = P_n + P_{x(y)}$

IMAGE GENERATION DEVICE AND METHOD USING DITHERING

FIELD OF THE INVENTION

This invention relates to video display technology wherein input data is used to provide an image at an output device. The invention relates more particularly to an improved image processing device which rapidly provides an image that appears to have an improved resolution by using a dithering technique.

DESCRIPTION OF THE PRIOR ART

Input data required by a display system to generate an image generally includes information regarding both the location and intensity of various points. However, depending on the capabilities of the output device, the input data may include more information than the output device can utilize to generate an image. Specifically, while the input data may suffice to generate an image having a certain resolution, the output device may be incapable of handling all of the input data, and will at best be able to generate an image having a lower resolution. For example, consider that the input data may include enough data to generate an image having 256 levels of intensity (represented by 8 bits). From this, it would be possible to display the image (or a corresponding image) on a device having only 16 levels of intensity (represented by 4 bits). To display the image, the lowest 4 bits could be truncated, leaving an output having a lower resolution. Thus, a set of input data can be used to generate any one of a group of display images, each depicting the same object, but in varying degrees of resolution.

However, a dithering technique also could be applied. Dithering is a technique for displaying an image that appears to have better resolution on a device that does not really have enough color (or intensity) resolution. While the resolution of the output device may be generally lower, dithering modifies the output to provide an output image which appears to the human eye to have a greater resolution as compared to an output which is not dithered.

The prior art dithering techniques include a series of steps to alter the output. However, these steps also increase the processing time required to generate the image. In the case of digital systems, depending on the number of bits that can be processed by the output device, the bits which represent the intensity are divided into integer bits and fractional bits. The bits of the input representing the intensity are divided such that the number of integer bits is equal to the number of bits that can be used by the output device to generate an image at the output. Generally, the value of the fractional bits is compared to a certain value in a dither matrix to determine whether the intensity value represented by the integer bits will be incremented by one. After the integer values are incremented, the fractional values are ignored and the integer portions are provided to the output for use in the display device. By incrementing certain of the output values based on this comparison, it is possible to generate an image which has an overall "smoother" appearance or generally appears to have a greater resolution.

However, the dithering process is not without cost. Rather, the prior art dithering process requires a series of time-consuming steps which delay the generation of the image. Specifically, after dividing the intensity bits into integer and fractional bits as described above, a device performing the dithering process in the prior art would first "look up" the dither value in a dither matrix. The dither value would be found at a position in the dither matrix corresponding to the position of the input word depending, for example, on the X and Y coordinates of the input word. This dither value is then compared to the fractional bits of the input word. If the fractional value is greater than the dither value, the integer value of the intensity is incremented by one. Finally, if the input word after dithering is incremented to a value greater than a maximum intensity in the range of intensities, the intensity is then defined by the maximum intensity.

An object of the invention is to provide a device which provides a simpler dithering technique and rapidly generates an image from input data having a certain number of bits on a device which is capable of processing a lesser number of bits, thereby generating an image which appears to have an improved resolution.

A further object of the present invention is to increase the speed of generating an image using dithering by reducing the number of steps required to generate an image which appears to have an improved resolution as a result of dithering.

A further object of the invention is to provide dithering during the rendering process of the image intensities to eliminate processing time even further.

SUMMARY OF THE INVENTION

The present invention comprises a device and a method for generating images by means of dithering. As described above, dithering is a technique used to "smooth out" the junction between various intensity levels displayed in the output image of a device, particularly a device capable of processing only a certain number of the input intensity bits and generating an output having a certain resolution. Specifically, dithering prevents the appearance of a sharp contrast between two different intensity levels which are positioned adjacent to one another, a phenomenon commonly called "banding." Therefore, the contrast between two adjacent intensity levels appears less drastic to the human eye as a result of dithering and gives the image an overall appearance of having a greater resolution.

While dithering is known in the art, the present invention more effectively applies dithering techniques to generate an image. Considering that compilation time for complex images can be lengthy, any improvement as a result of a more rapid dithering process can be significant. Specifically, the present invention reduces the required steps to perform dithering as compared to prior art dithering. While it is possible to generate pixels including intensity values from the input data, and then perform the dithering process, the present invention performs dithering during the rendering of the pixel intensities so that the image need only be computed at a smaller number of bits per pixel. The present invention dithers the value and then writes the pixel including the intensity value into a register. As a result, no additional processing of the pixel intensities is needed. The present invention can be used to convert one image into another or to generate a new image. Depending on the number of dithering values chosen, additional embodiments provide a dithered image requiring even fewer processing steps.

BRIEF DESCRIPTION OF THE DRAWINGS

Reference is made to the accompanying drawings wherein.

DESCRIPTION OF THE PREFERRED EMBODIMENT

The image generation device of the present invention is configured to dither input data during the rendering process to rapidly output a "smoother" image on a display device. Specifically, before the input intensity data is assigned to the output buffer to be displayed at the output, the input data is dithered. However, the present invention provides a unique device for dithering. First, the present invention adds a dither value to the fractional value instead of comparing the fractional bits of the input word to a value in the dither table as is done in the prior art. This eliminates any comparison to a value in a dither table. By adding the dither value to the intensity in an input register, the invention takes advantage of the natural "carry" operation of the addition of numbers to provide the increment function, which results in a dithered output. Furthermore, the present invention selectively assigns intensity values to the input data to eliminate the need to compare the output value to the maximum output value, as is required under the prior art. These features will be described in more detail below in reference to the Figures.

Figure 1A:
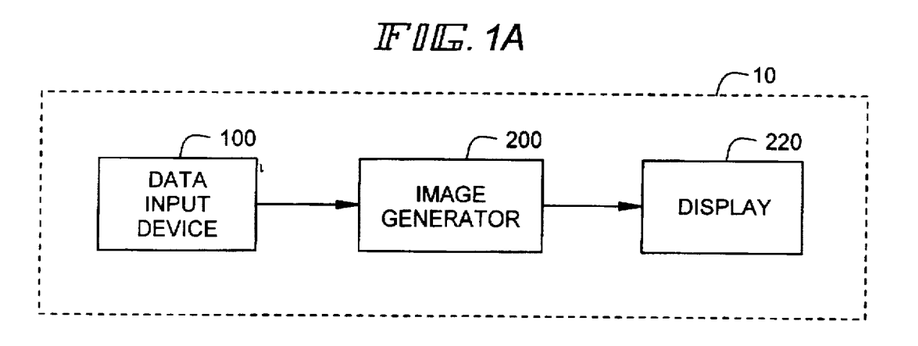
FIG. 1A is a block diagram of the image generating device.
Figure 1B:
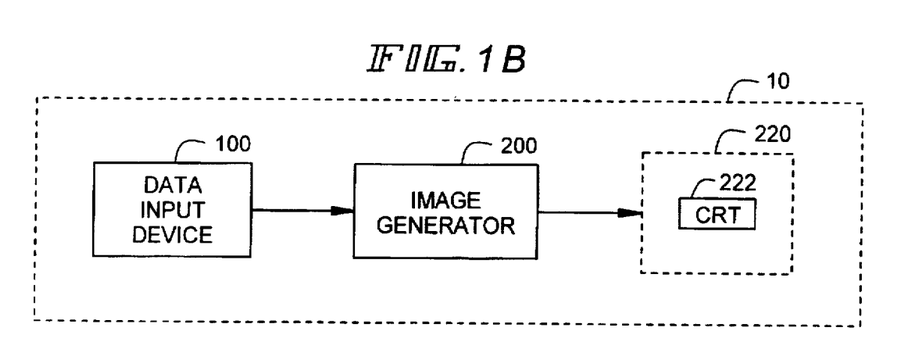
FIG. 1B is a block diagram of the image generating device incorporating a CRT.
Figure 1C:
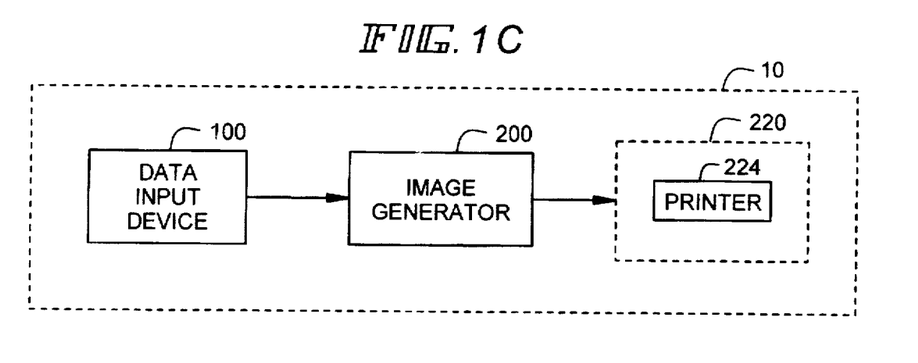
FIG. 1C is a block diagram of the image generating device incorporating a printer.

FIG. 1A is a block diagram of an image generation device 10. An input data device 100 generally inputs data to an image generator 200. The input data device could include any device to provide data to the image generator, such as a disk drive, or any other means of loading data. The image generator 200 can include any device which can process data and provide an output for display of an image. An image generator could include such devices as a personal computer, a main frame computer or other computational device which is able to process large amount of data to generate images. In the preferred embodiment, a mainframe computer is used as an image generator to process the data. A graphics computer such as a Stardent Vistra 800 has been found most suitable. Finally, the output of the image generator is displayed by means of a display 220, such as a CRT 222 or a color printer 224. The CRT 222 may be a raster scan type or another type.

Figures 2A, 2B:
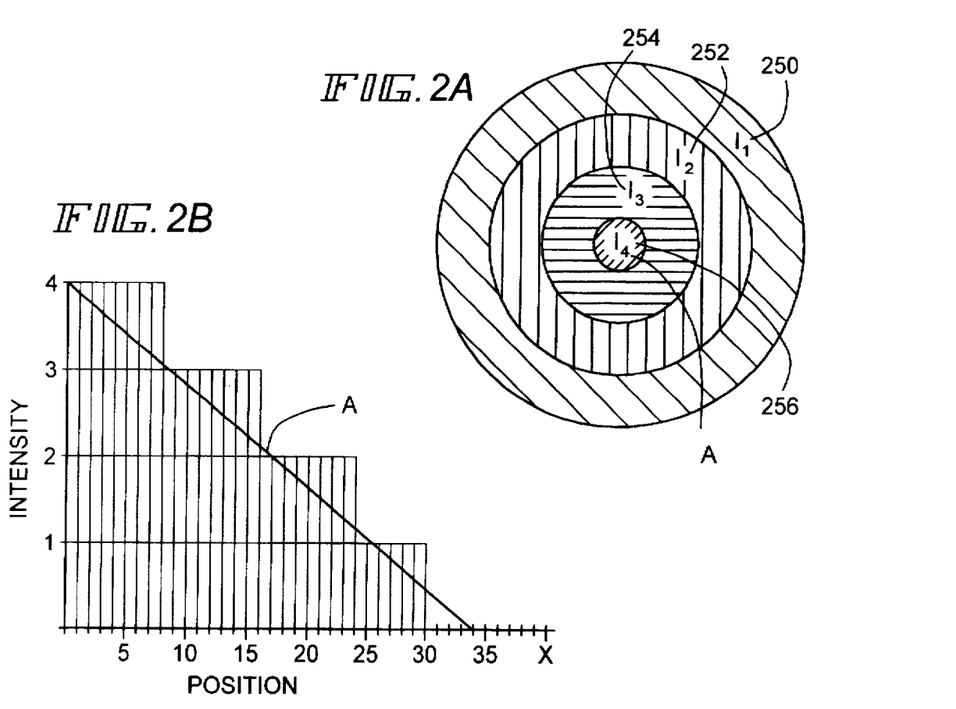
FIG. 2A shows the "banding effect" when different intensities are positioned next to one another when dithering is not employed.
FIG. 2B shows the intensity level corresponding to four intensity values as a function of position along line A in the x-direction.
Figure 2C:
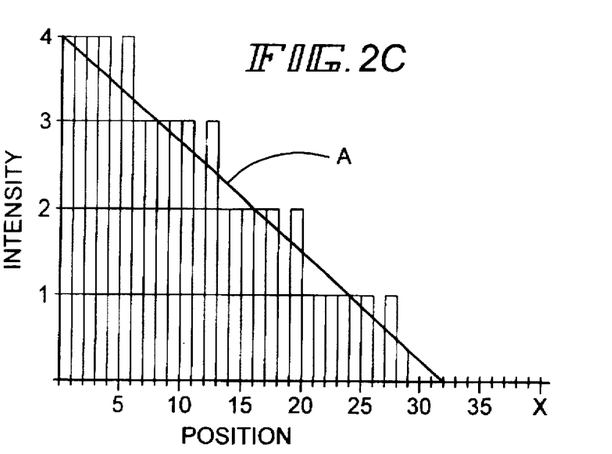
FIG. 2C shows the intensity level corresponding to four intensity levels as a functional position along line A in the x-direction after applying the dithering process.

FIGS. 2A–C show the effect of dithering on the appearance of an image which is generated. FIG. 2A shows an image which could be displayed on a screen having four intensity levels, $I_1$ through $I_4$. The contrast between the adjacent intensity levels, commonly known as "banding," is apparent. This contrast is further depicted in FIG. 2B which shows the intensity levels as a function of position in a single direction, such as the X or Y directions. In this example, line A shows this intensity level as a function of X from the center of the image extending outward toward the periphery of the image where the intensity drops to zero. Without dithering, the contrast between the adjacent different levels is obvious and substantial. Specifically, the intensity values of the points along line A progress in a series of blocks of the same intensity levels which are adjacent. That is to say, there are a number of positions of intensity "4", then a number of positions of intensity "3", and so on.

However, as is shown in FIG. 2C, dithering provides a smoother transition between different intensity levels. Specifically, the representation of the intensity levels is not shown as a group of level "4" intensities, followed by a group of level "3" intensities, followed by a group of level "2" intensities. Rather, a value of greater or lesser intensity within each group may be included as a result of dithering. Even though these are abrupt rises and falls in FIG. 2C, the dithering nevertheless results in a smoother transition between intensity levels. While this example includes only four intensity levels within the spectrum of possible intensities, the spectrum could include a larger or smaller number of intensity levels. Furthermore, the effects of dithering with a larger number of points along the abscissa (x-axis) would provide a greater "smoothing" of the resulting image.

Figure 3:
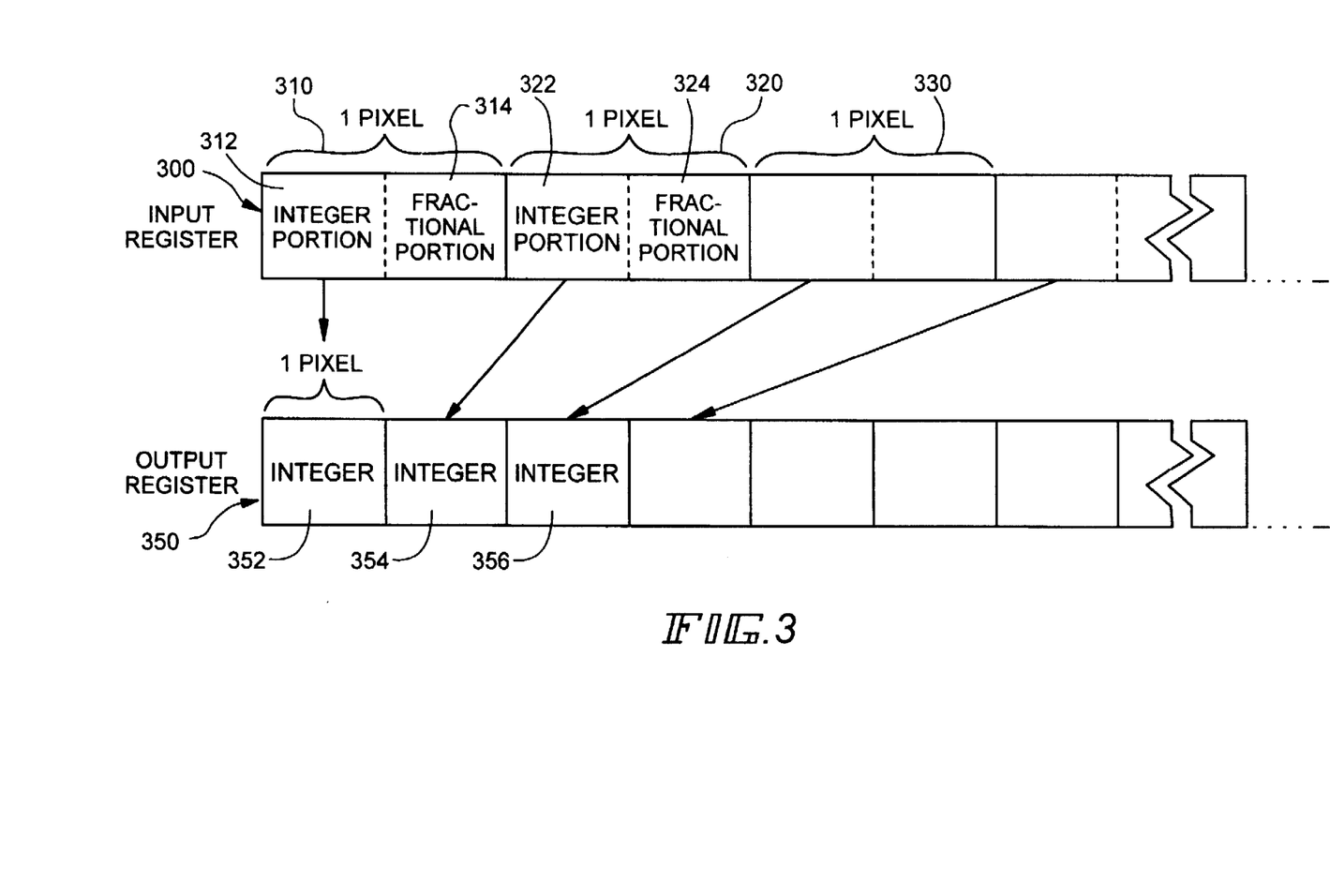
FIG. 3 shows the registers used to store the input and output bits in the image generation device.

FIG. 3 depicts two registers 300 and 350 generally employed in the prior art to receive input bits and assign output bits. Dithering is applied when the output bits are fewer in number than input bits. For ease of understanding, the decimal system will be used in describing dithering in both the prior art and the image generating device of the present invention. However, any number system, such as binary or hexadecimal number systems, could be used.

FIG. 3 shows an input register 300 and an output register 350. Arrows point from certain bit locations of the input register 300 to certain bit locations of the output register 350. A sequence of input words is loaded into the input register 300. Each input word (310, 320 and 330 in FIG. 3) represents one pixel and includes a certain number of bits. Each input word represents the location and intensity and, for example, could be represented by 8 bits, although any number of bits could be used.

Referring to the first input word 310, certain bits will represent integer bits 312 and the remaining bits will represent fractional bits 314. The number of integer bits and fractional bits depends on the number of bits available in the output register 350.

In the dithering process of the prior art, the fractional bits 314 are compared to a dither value associated with each input word. Generally, the dither value is assigned to an input word 310 depending upon the location (i.e. the x and y coordinates of the input word). If the fractional value 314 of the input word 310 is greater than the associated dither value, the integer value is incremented (upward) by one prior to being transferred to output register 350. Further, the prior art devices which perform dithering must check each integer value to make sure that any incremented integer value is not greater than some maximum intensity value for the output device.

However, the image generation device of the present invention, the operation of which is described in detail in reference to the remaining figures, eliminates some of the processing requirements required by the prior art devices. The following description will be based upon a first input word 410 in an input register 400 of FIG. 4A, although the description would apply equally to any other input words in the input register 400.

Figure 4A:
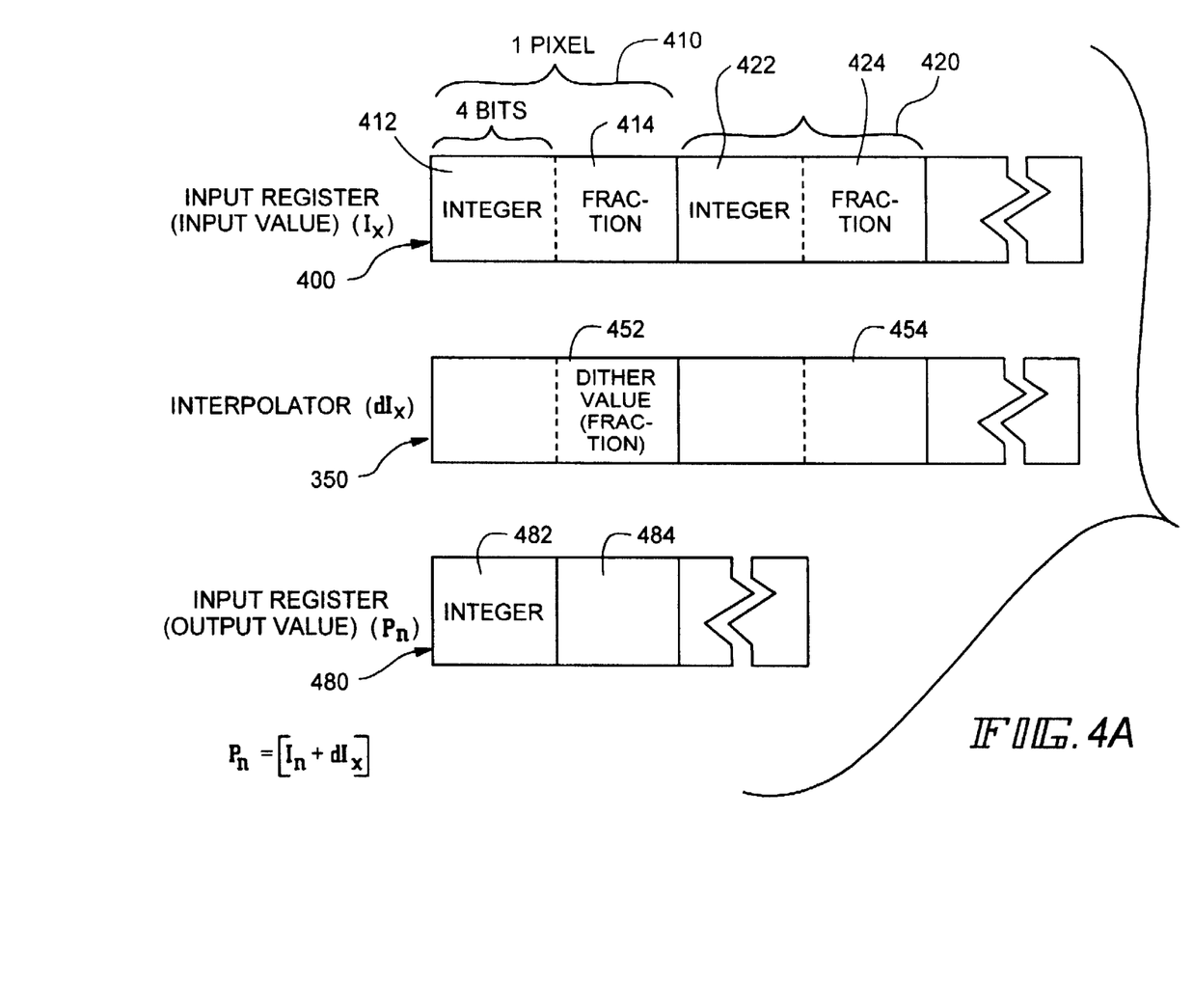
FIG. 4A shows the input register, the interpolator register and the output register for generating the pixel value.

FIG. 4A shows an input register 400 to receive a sequence of input words. As in the prior art, an input word 410 is generally divided into an integer portion 412 and a fractional portion 414. As will be described in more detail in reference to FIG. 5, each input word is assigned a dithering value 452. The dithering value 452 associated with input word 410 is retrieved from a memory 500, comprising a dither matrix, and placed in an interpolator 450. In the preferred embodiment, the interpolator is a register. To generate output data, the input word 410 and the dithering value 452 are added in an adder 460. When these values are added, the natural carry function of the addition may result in "incrementing" the integer portion 412 of the input word. As a result, the use of an interpolator 450 and the natural carry function of adding eliminates the separate steps of (i) comparing the dither value to the fractional value and (ii) incrementing the integer portion if the fractional value is greater than the dither value, as required on the prior art.

Furthermore, the image generating device of the present invention eliminates the requirement of checking the output values after dithering to ensure that the value does not exceed the maximum intensity value of the output device. The requirement of checking the dithered input values is eliminated by selectively assigning an input values to input data. The input values are assigned to the input words depending on the number of intensity levels available at the output. For example, an input intensity level for a input data is typically provided as a value between 0 and 1. The input data is then converted to input values which are provided to the input register. The input values are assigned a value between 0 and some maximum assigned value. By selectively choosing this maximum value, the resulting integer portion after dithering will not exceed the maximum intensity value.

The section of a maximum intensity value assigned to input data can be best understood by way of example. For an output device which can generate an image having 16 intensity levels (e.g. numbered 0–15), the maximum input intensity level would be some number less than 16. If the maximum dithering value were, for example, 0.75, one would assign as the maximum input data intensity level to be some number less than 15.25. As a result, the sum of the maximum input data intensity level and the maximum dithering value would necessarily be some number less than 16 and would not result in a carry. Specifically, the integer value would remain at 15, which is the maximum intensity usable by the output device. Therefore, the present invention in one aspect defines the range of intensity levels of the input values which eliminates the need to compare the dithered intensity value to the maximum intensity value of the output device. Note that while such an assignment of intensity levels prevents the carry operation of the input word when added to the maximum input intensity value, all other (lower) assigned input values may be incremented by the carry function to provide the dithering of the present invention.

Figure 5:
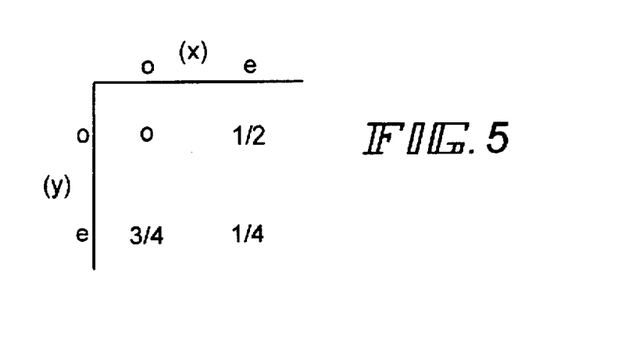
FIG. 5 shows a dithering values incorporated into the first embodiment.

Having described the assignment of input values to the input data, the dither values must also be assigned. Specifically, the dither values, which are shown for example in FIG. 5, are chosen to provide a smoother output when the dithering function is accomplished. Specifically, the dither values shown in FIG. 5 are stored in a two-by-two matrix. Such values could be a part of the software which runs the device or could be stored in a ROM. Each input word is assigned a single dither value. In the preferred embodiment, the assigned dither value depends upon the location (e.g. the x and y coordinates) of the input word.

One method of assigning dither values could be accomplished by the use of a modulus function. Specifically, the dithering value is then assigned to the input word depending on the modulus for each of the x and y components. For example, in reference to FIG. 5, if the modulus of the x component were odd (i.e. a remainder of 1 after division by 2) and the modulus of the y component were even (i.e. a remainder of zero after a division by 2), the dither value would be found in the odd x column and the even y row. In FIG. 5, this value would be ½. However, any method of assigning dithering numbers could be used. This may involve looking up dithering values that have been previously stored in a read only memory, or can be computed, or stored in other devices.

Figure 4B:
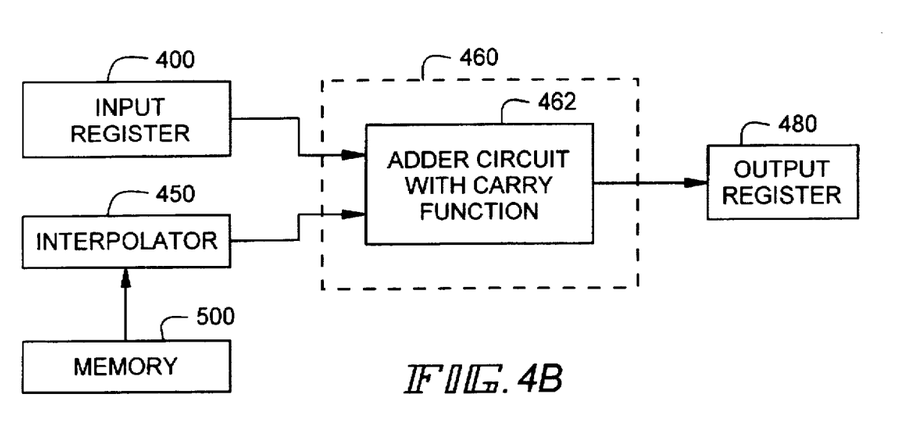
FIG. 4B is a block diagram for generating a pixel value incorporating an adder circuit with carry function.
Figure 4C:
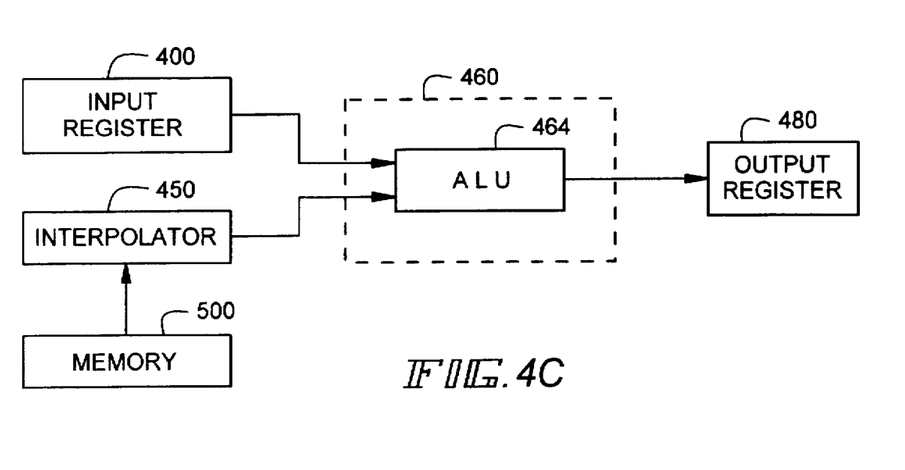
FIG. 4C is a block diagram for generating a pixel value incorporating an ALU.

Having assigned both the input value and determined the dithering value, it is now possible to determine the output value which is used to generate the image. The output value 482 equals the input value 410 added to the dithering value 452. If the fractional value of the input value and a dithering value results in an overflow, the integer value is incremented. The addition may be performed in an adder circuit having having a carry function 462, or in an Arithmetic Logic Unit 464 (ALU) of a computer device. The output bits 482 are represented by a certain number of bits specific to the output 220. For example, the output words could consist of four bits. Depending on the number of output bits, the input bits are right shifted in a fixed point system such that output word contains only the integer bits after any incrementing. The fractional bits will only be discarded after the dithering is completed and the integer bits of the input word are transferred to the output buffer. Circuitry for such bit shifting is well-known and not illustrated. It suffices to say that the addition operation performed on values in registers enables the natural function of overflow or carry to provide both the comparison function and the increment function in the prior art.

The Second Embodiment

In a second embodiment, the image generation device further reduces the steps in generating an image. By using a small number of dithering values, such as four, it is possible to eliminate the step of a "look up" from a dithering table as is required in the first embodiment. The second embodiment eliminates any need to "look up" a dither value, by relying on the location of the subsequent input word and updating the previous dither value. Specifically, a certain dither value is added to the input word when moving, for example, in the X direction or the Y direction. In the preferred embodiment, a dither value updated by adding ½ to the previous dither value for steps in the x direction and adding ¼ to the previous dither value for steps in the y direction. Although this embodiment is most effective when assigning a small number of dithering values, any number of dithering values could be used.

The Third Embodiment

Finally, a third embodiment, which is also applicable to a two-by-two dithering matrix, updates a dithering value depending on both the location of the input input word and the location of the next input word. Therefore, the third embodiment takes advantage of the known dither value from the present location and the dither value for next location to define a new dither value.

Figure 6:
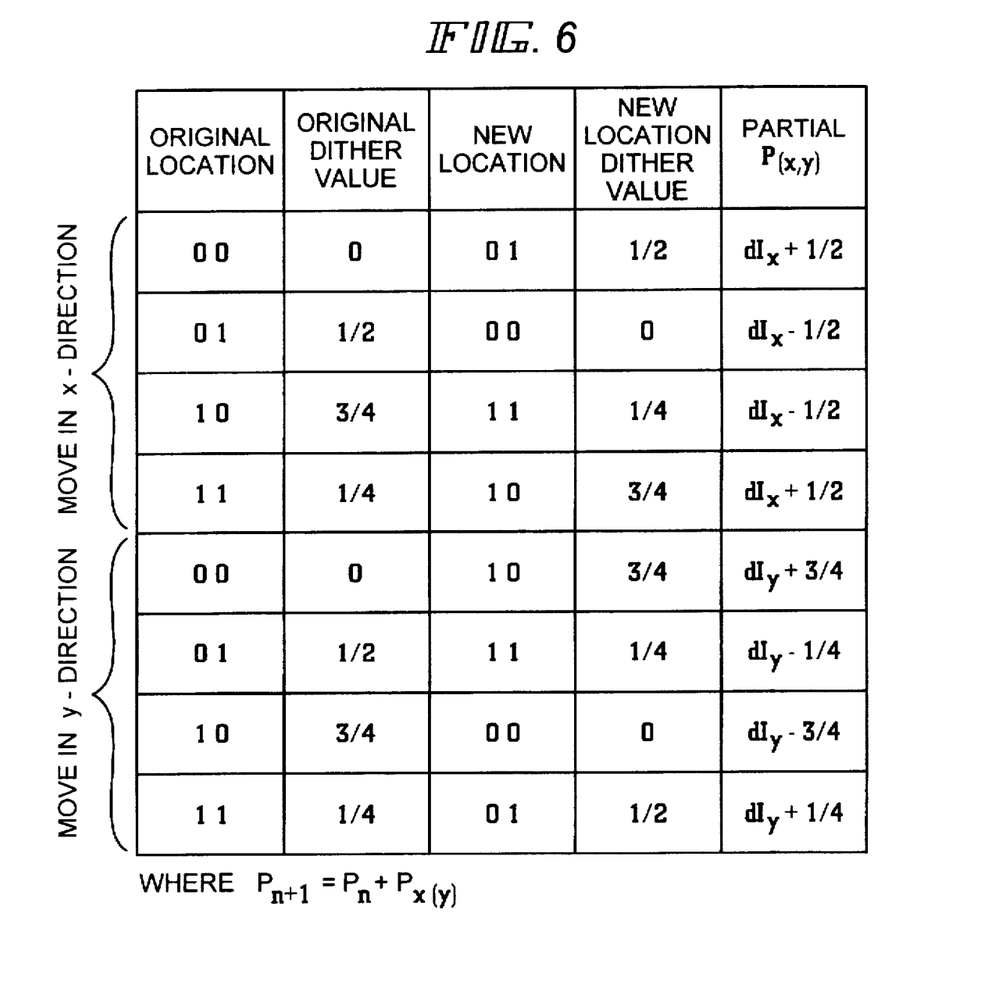
FIG. 6 shows an input/output table corresponding to the dithering values of the third embodiment.

The application of the third embodiment can best be understood in reference to FIG. 6. FIG. 6 shows a table which generates dither values depending on the present location of the initial input word and the location of the next input word. This embodiment takes advantage of the known value of the dithering term in the original location as well as the value of the dithering term in the new location. For example, as shown in the first row, when the original location corresponds to the 00 location in the dither matrix and the input value corresponds to the 01 in the dither matrix (i.e. a move in the X direction from the 00 position), the dithering value is ½, which is added to the input word. Further, when the original location corresponds to a 00 position in the dither table and move in the Y direction, where the location of the next input value to be processed would correspond to 10, ¾ is added to the interpolator. These dither values are determined based on the dither value of the original location and the new dither value of the new location. While this embodiment is best used when assigning a small number of dither values, this embodiment could also be used when assigning any number of dithering terms.

While this specification refers to specific elements, these references are not intended as limitations. Rather, the specification is intended to cover any substitutes which are well known in the art.

I claim:

1. An image processing device comprising:
    an input register coupled to receive input data which includes location and intensity information of images to be displayed;
    an interpolator register coupled to receive a dithering value which is dependent on the location information of the input data in the input register;
    an adder coupled to said input register and said interpolator register and configured to provide a resultant value of the addition of the intensity information of the input data and the dithering value; and
    an output register coupled to said adder for receiving a selected number of bits of the resultant value,
    wherein the dithering value is dependent on the location information of a next input data.

2. The image processing device of claim 1 wherein said adder comprises an adder circuit having a carry function.

3. The image processing device of claim 1 wherein said adder comprises an arithmetic logic unit in a microcomputer.

4. The image processing device of claim 1 further including a display device coupled to said output register for displaying a representation of the output data.

5. The image processing device of claim 4 wherein said display device comprises an electronics display screen.

6. The image processing device of claim 4 wherein said display device comprises a printer.

7. The image processing device of claim 1 wherein the image processing device comprises a computer capable of processing computer graphics.

8. The image generating device of claim 1 further including a memory to store a dithering value in a dithering table.

9. An image processing device comprising:
    an input register coupled to receive input data which includes location and intensity information of images to be displayed;
    an interpolator register coupled to receive a dithering value which is dependent on the location information of the input data in the input register;
    an adder coupled to said input register and said interpolator register and configured to provide a resultant value of the addition of the intensity information of the input data and the dithering value; and
    an output register coupled to said adder for receiving a selected number of bits of the resultant value,
    wherein the dithering value is dependent on the location information of the input data and on the location information of a next input data.

10. The image processing device of claim 9 wherein said adder comprises an adder circuit having a carry function.

11. The image processing device of claim 9 wherein said adder comprises an arithmetic logic unit in a microcomputer.

12. The image processing device of claim 9 further including a display device coupled to said output register for displaying a representation of the output data.

13. The image processing device of claim 12 wherein said display device comprises an electronics display screen.

14. The image processing device of claim 12 wherein said display device comprises a printer.

15. The image processing device of claim 9 wherein the image processing device comprises a computer capable of processing computer graphics.

16. The image generating device of claim 9 further including a memory to store a dithering value in a dithering table.

17. A method of generating an image including the steps of:
    receiving input data including location information and intensity information;
    adding a dithering value associated with the input data to the intensity information to generate a resultant value;
    generating an output value including a selected number of bits of the resultant value; and
    generating an image based upon said output value,
    wherein the step of adding a dithering value to intensity information includes providing a dithering value which is dependent on the location information of a next input data.

18. The method of generating an image of claim 17 wherein the step of adding a dithering value to the intensity information includes operating an adder circuit having a carry function.

19. The method of generating an image of claim 17 wherein the step of adding a dithering value to the intensity information includes operating an arithmetic logic unit in a microcomputer.

20. The method of generating an image of claim 17 wherein the step of generating an output value includes truncating bits of the resultant value to generate a selected number of bits.

21. The method of generating an image of claim 20 wherein the output value is an incremented value of the intensity information when the addition of the dithering value and the intensity information results in the carry of the least significant bit of the selected number of bits of the intensity information.

22. The method of generating an image of claim 17 wherein the step of generating an image based upon the output value includes displaying the image on an output device.

23. The method of generating an image of claim 22 wherein the step of generating an image includes displaying the image on an electronics display screen.

24. The method of generating an image of claim 17 wherein the step of adding a dithering value to intensity information includes providing a dithering value which is stored in memory.

* * * * *